US006397385B1

(12) United States Patent
Kravitz

(10) Patent No.: US 6,397,385 B1
(45) Date of Patent: May 28, 2002

(54) METHOD AND APPARATUS FOR IN SERVICE SOFTWARE UPGRADE FOR EXPANDABLE TELECOMMUNICATIONS SYSTEM

(75) Inventor: Barry Kravitz, Middleboro, MA (US)

(73) Assignee: Excel Switching Corporation, Hyannis, MA (US)

( * ) Notice: Subject to any disclaimer, the term of this patent is extended or adjusted under 35 U.S.C. 154(b) by 0 days.

(21) Appl. No.: 09/356,284

(22) Filed: Jul. 16, 1999

(51) Int. Cl.[7] ............................................... G06F 9/445
(52) U.S. Cl. ..................... 717/173; 717/169; 717/170; 717/171; 717/177; 717/178; 711/102; 709/242; 709/245; 709/246; 709/327
(58) Field of Search ................................. 717/1, 11, 173, 717/169, 170, 171, 177, 178; 711/102; 709/242, 245, 246, 327

(56) References Cited

U.S. PATENT DOCUMENTS

| 4,425,618 | A | | 1/1984 | Bishop et al. | |
|---|---|---|---|---|---|
| 5,349,579 | A | | 9/1994 | Madonna et al. | 370/58.2 |
| 5,544,163 | A | | 8/1996 | Madonna | 370/60.1 |
| 5,682,533 | A | | 10/1997 | Siljestroemer | 395/616 |
| 5,764,992 | A | | 6/1998 | Kullick et al. | 395/712 |
| 5,859,982 | A | * | 1/1999 | Lindholm | 709/203 |
| 5,896,527 | A | | 4/1999 | Ceruti et al. | |
| 6,052,732 | A | * | 4/2000 | Gosling | 709/203 |
| 6,070,012 | A | * | 5/2000 | Eitner et al. | 717/11 |
| 6,138,274 | A | * | 10/2000 | Huang et al. | 717/11 |
| 6,263,499 | B1 | * | 7/2001 | Nakamura et al. | 345/705 |
| 6,279,153 | B1 | * | 8/2001 | Bi et al. | 717/171 |
| 6,282,709 | B1 | * | 8/2001 | Reha et al. | 717/175 |
| 6,289,510 | B1 | * | 9/2001 | Nakajima | 717/170 |
| 6,298,480 | B1 | * | 10/2001 | Beuk et al. | 709/217 |
| 6,301,710 | B1 | * | 10/2001 | Fujiwara | 707/10 |
| 6,308,325 | B1 | * | 10/2001 | Dobbek | 717/178 |

OTHER PUBLICATIONS

Haas et al., "A Case For Packet Switching in High–Performance Wide–Area Networks", pp. 402–409, Aug. 1987.*
Symborski, "Updating Software and Configuration Data In A Distributed Communications Network", Computer Networking Symposium, IEEE, pp. 331–338, Apr. 1988.*

* cited by examiner

Primary Examiner—Tuan Q. Dam
Assistant Examiner—Ted T. Vo
(74) Attorney, Agent, or Firm—Cesari & McKenna, LLP

(57) ABSTRACT

A method and apparatus is provided for upgrading software, or a portion thereof, on a continuously running system, while the system is operating. A base set of software is built which contains a reserved memory area in its memory architecture. Upgrade source files are built into the reserved memory area. The upgrade images are extracted out and converted into loadable upgrade images. A header indicates where the upgrade is to be downloaded in the system and also identifies the location in the reserved memory area at which the upgrade is to be stored in the relevant component of the system. The upgrade is downloaded into the respective reserved memory area in the memory storage devices in the respective components in the system. The downloads can be performed while the system is operating because the reserved memory area does not contain live code. The upgrades are activated or deactivated using a jump instruction sequence.

8 Claims, 5 Drawing Sheets

METHOD AND APPARATUS FOR IN SERVICE SOFTWARE UPGRADE FOR EXPANDABLE TELECOMMUNICATIONS SYSTEM

FIELD OF THE INVENTION

The present invention relates generally to upgrading software on a continuously operating computer system, and, more specifically, to effecting such upgrades in the field of telecommunications systems.

BACKGROUND OF THE INVENTION

Computer programs which are initially installed and configured on one or more storage devices in the system at start up typically control continuously operating computer systems. The programs are sets of software instructions which perform together to control a variety of functions in many different components of the system.

It is often desirable to make modifications to such system software in order to provide additional features to the system, to solve problems or "bugs" which have been found during operation of the system, or to accommodate new developments in technology. Conventionally, when a software upgrade is to be made, a new version of the software code is typically installed and configured on the system. For example, the new code is often installed as a traditional download but for this, normal operation of the running system must be interrupted. Shutting down system operations, in whole or in part, leads to financial and service losses due to the downtime involved.

A mechanism of upgrading stand alone programs, such as word-processing programs or drafting programs, was described in U.S. Pat. No. 5,764,992 (Kullick). In accordance with the method described in Kullick, the program checks for an updated or more recent version of itself upon start up. The new version may be resident in the memory on the hard disk or on a network file server. When the current version starts up and finds that an updated version exists, it overwrites itself with the updated version. The entire program thus replaces itself with a new version during start up, or shut down. Alternatively, the new program can be written to install itself while the computer is not in use. The Kullick patent describes a method of replacing an entire program with a new version of itself while the system is essentially down or not in use.

In a continuously running system, however, such as a telecommunications system, there is no time at which the system is routinely down or not being used. More specifically, a telecommunications system operates continuously as consumers expect to have access to telephone service twenty-four hours a day. Thus, interruptions to system operation can be extremely costly for the service provider and, at the very least, inconvenient to users.

A telecommunications switching system can be comprised of several switching nodes and voice processing resource nodes which are inter-connected by an inter-nodal network, often connected as a ring. Such a system is controlled by software tasks resident on a host computer or a network file server, as well as in microprocessors running on individual cards, like a switching matrix card or a line card and the like. These cards are located within a switching node, voice processing resource node or other application service node. It is often necessary or desirable to upgrade software running on these microprocessors in order to provide additional features, to solve problems which have arisen during the operation of the system or to bring a new card into service. This does not always involve the entire system, but rather, for example, may relate to the software resident on a particular node, or on a portion of software which is running on one type of line card in the system. In addition, many times, a "patch" of a portion of code is to be made by replacing or modifying a portion of the program. In such a case, it is unnecessary to replace all of the software running on a particular type of card, instead it may be that merely a few lines of code are to be replaced.

At present, software upgrades to telecommunications systems and other continuously running systems have been managed as system software releases which are installed as traditional downloads for which system operation must be interrupted, even if only a portion of the system is affected by the upgrade.

A method of replacing an entire program, or a task, running on a telecommunications system has been described. However, this involves a complex mechanism for replacement of substantially the entire task and may also require shut down of certain aspects of the system, or even the entire system.

There remains a need, therefore, for a mechanism by which a software upgrade may be effected in a continuously running system, without interruption of operation of the system.

There remains a further need for the ability to amend only a portion of a running software program in such a system or in a subset of the system.

SUMMARY OF THE INVENTION

The present invention is a method and apparatus for performing a live upgrade of the software running on a continuously operating system, such as for example, a telecommunications system, without interrupting the operation of the system.

Briefly, in accordance with the invention, a software upgrade mechanism includes a unique method of building a base set of software that includes the capability of accepting an upgrade which can then be activated while the system is on-line. The method of the present invention includes establishing in the base software architecture, a reserved memory area. The reserved memory area is an allotment of a portion of memory that is held available for prospective upgrades; and it represents a corresponding reserved memory area in each memory storage device in each component in the system for which the upgrade is targeted.

In accordance with the invention, when an upgrade is to be built, the first step in the process is to write upgrade source files and place them within the file set of an existing base build. It is assumed that a base build has previously been written. Next, the up-grade source files are written. The upgrade source files contain various products, such as, for example: code, uninitialized data, initialized data, constants and the like. Each product of a particular type associated with that upgrade is given a predetermined name in accordance with a suitable naming convention.

The base files and the upgrade source files, as well as build instructions are inputs to an appropriate make/build software utility. The build instructions notify an associated compiler and linker where to locate in memory the various portions of the build depending upon the names of those products. The products of the upgrade source files having particular names are located at designated addresses in the reserved memory area. In addition, the compiler and linker resolves the addresses to all referenced global data or other functions in the base software build to ensure that code in the upgrade that calls routines in the base build can identify where those routines are located.

As will be well understood by those skilled in the art, after compiling and linking, a map file is produced. The map file includes information such as the names of the products of the base build and of the upgrade build. It also includes information about where those products are located in memory which ultimately leads to the determination as to where those products will be located in the individual memory storage devices in the system after the download.

In accordance with the invention, a software utility reads the map file and identifies where in the memory image of the overall build the upgrade is located. The utility then extracts the upgrade products and generates a loadable upgrade image which consists of the upgrade (without the base build) and a header.

The header is designed based upon the information in the map file and is associated with the loadable upgrade image. The header may include information about the type of system component, such as a matrix card or a line card in a telecommunications system, for which that particular upgrade is targeted, the address in the reserved memory area of the storage device in that card at which the upgrade is to be stored, as well as other information such as checksum information, date, and the relevant software revision number.

The upgrade is then downloaded to the targeted cards in the system. Such downloads can be performed while the system software is running, and without interruption of the operation of the system, as the reserved memory area does not yet contain live code. The upgrade code that is downloaded into the reserved memory area is later activated in accordance with the invention. The downloads can thus be performed without overwriting existing code, and without the need to replace the entire program.

After downloading is complete, the upgrade may be activated. All upgrades do not have to be activated at the same time, or at all. It may be that although all line cards of a particular type receive an upgrade, it is desired to activate the upgrades in only certain of the nodes in the system. In accordance with the invention, the user can determine which upgrades are to be activated.

Activation is performed by overlaying an instruction which transfers control to a different address using a hard jump sequence, for example. In accordance with one aspect of the invention, a load-address-and-jump instruction sequence is overlaid at the beginning of an old function, which directs the program to the beginning of a new function, which has been loaded, into the reserved memory area for the upgrade. In an alternative embodiment of the invention, where an address table is being utilized to dynamically call up routines, then the new addresses of the upgraded code are loaded into available spaces in the jump table which direct the CPU to those new addresses. In either case, the context of the old routine is maintained and the CPU returns to where it would have returned had the old routine been executed. A simple mechanism is used to determine the integrity of activation of upgrades so that a piece of code that is executing at that moment is not patched while executing, as discussed in detail herein.

A messaging sequence between the host and a processing card in the system includes a means of querying the status of downloaded upgrades to determine whether that upgrade is activated or deactivated, as well as to compare the upgrades a card actually contains against a host-controlled list of upgrades that such a card type should contain. The query message may also include information about the amount of memory space available in the reserved memory segments for additional upgrades, if desired.

BRIEF DESCRIPTION OF THE DRAWINGS

The above and further advantages of the invention may be better understood by reference to the following description in conjunction with the accompanying drawings in which.

DETAILED DESCRIPTION OF THE PREFERRED EMBODIMENT

Figure 1:
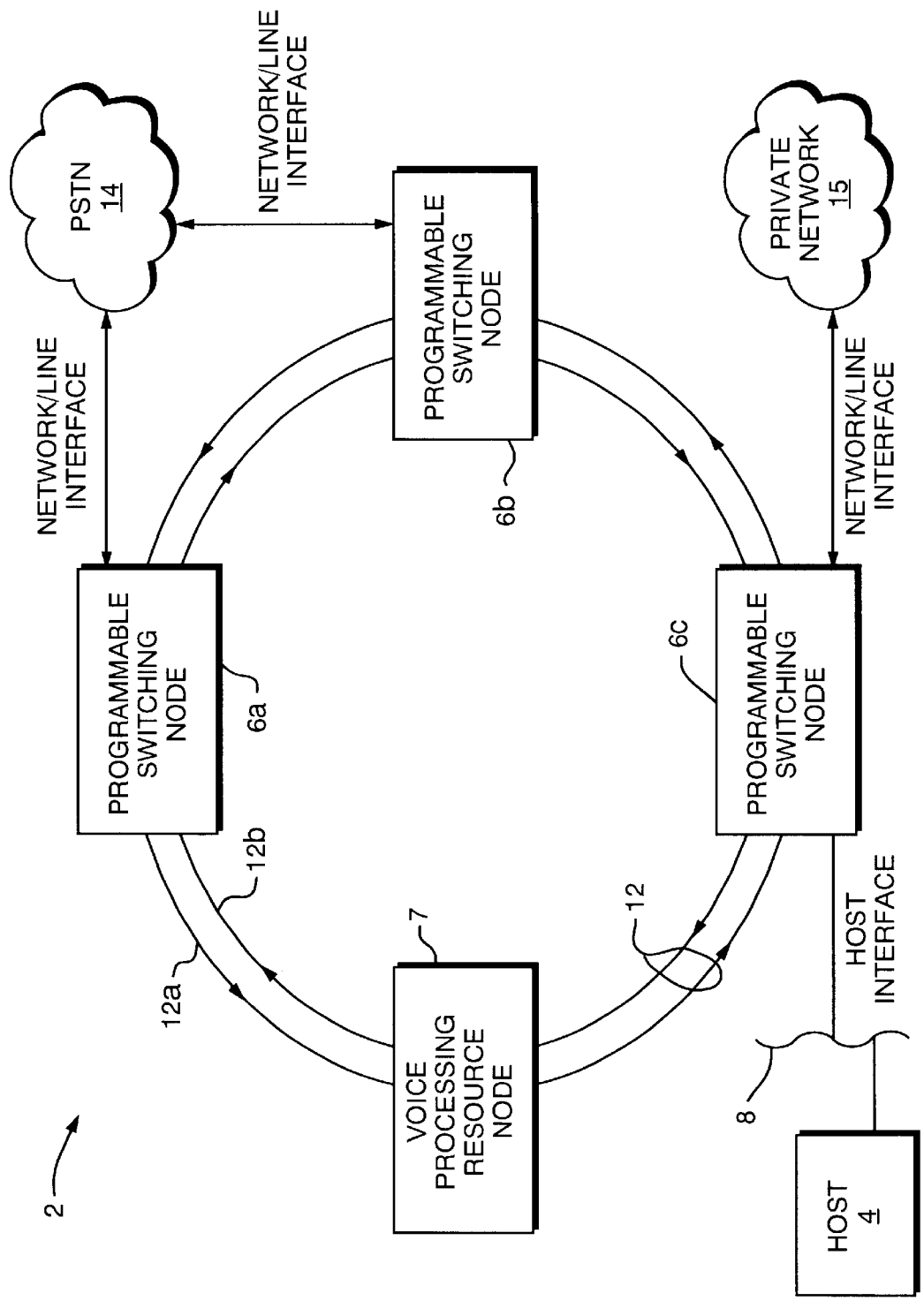
FIG. 1 is a block diagram of an expandable telecommunications system which employs an inter-nodal network to transfer information among programmable switching nodes and a voice processing resource node which may be used in accordance with one embodiment of the present invention.

FIG. 1 shows a large capacity, expandable, fully programmable telecommunications switching system 2. Details of the construction and operation of the system 2 may be found in commonly-owned U.S. Pat. No. 5,544,163 (Madonna), which is presently incorporated herein in its entirety by this reference.

To aid in the understanding of the preferred embodiment of the present invention, certain aspects of the system 2 are discussed here. The telecommunication system 2 is comprised of a host computer 4 and a plurality of inter-connected switching and non-switching switching nodes. The embodiment illustrated in FIG. 1 includes multiple switching nodes 6a–6c. The system 2 also includes voice processing resource node 7. Any number of such non-switching nodes which perform voice processing or communication services may be used in essentially any combination with any number of switching nodes in the system 2. The nodes 6a–6c and voice processing resource node 7 are connected by an inter-nodal network 12. The inter-nodal network 12 may be a fiber optic ring. The nodes 6a–6c, as well as voice processing resource node 7, include a host interface which is connected in communicating relationship with the host 4 by a local area network (LAN) such as Ethernet or some other communication link 8. Many of the switching nodes, such as the node 6a, also have a connection to a wireline telephone service as illustrated by PSTN 14. Calls may also be connected with wireless telecommunications systems or other private networks 15.

As noted, the inter-nodal network 12 is preferably implemented using one or more fiber optic rings, 12a and 12b. However, the inter-nodal network 12 may also be implemented with any physical medium suitable for communication networks, such as, for example, wide area networks, wireless communications networks, the PSTN, (ATM/SONET) and the Internet. Using some of these other communication media to implement the inter-nodal network 12 permits the nodes to be geographically distributed over a larger area.

The overall, essentially continuous, operation of the system 2 is controlled by the host 4 as well as the software running on individual cards within the nodes 6a–6c and voice processing node 7. The host 4 is commonly implemented with a personal computer (PC) work station, fault tolerant or other computer on which the user's application runs. The host 4 communicates with the nodes 6a–6c and node 7 by exchanging messages over the LAN/link 8.

Figure 2:
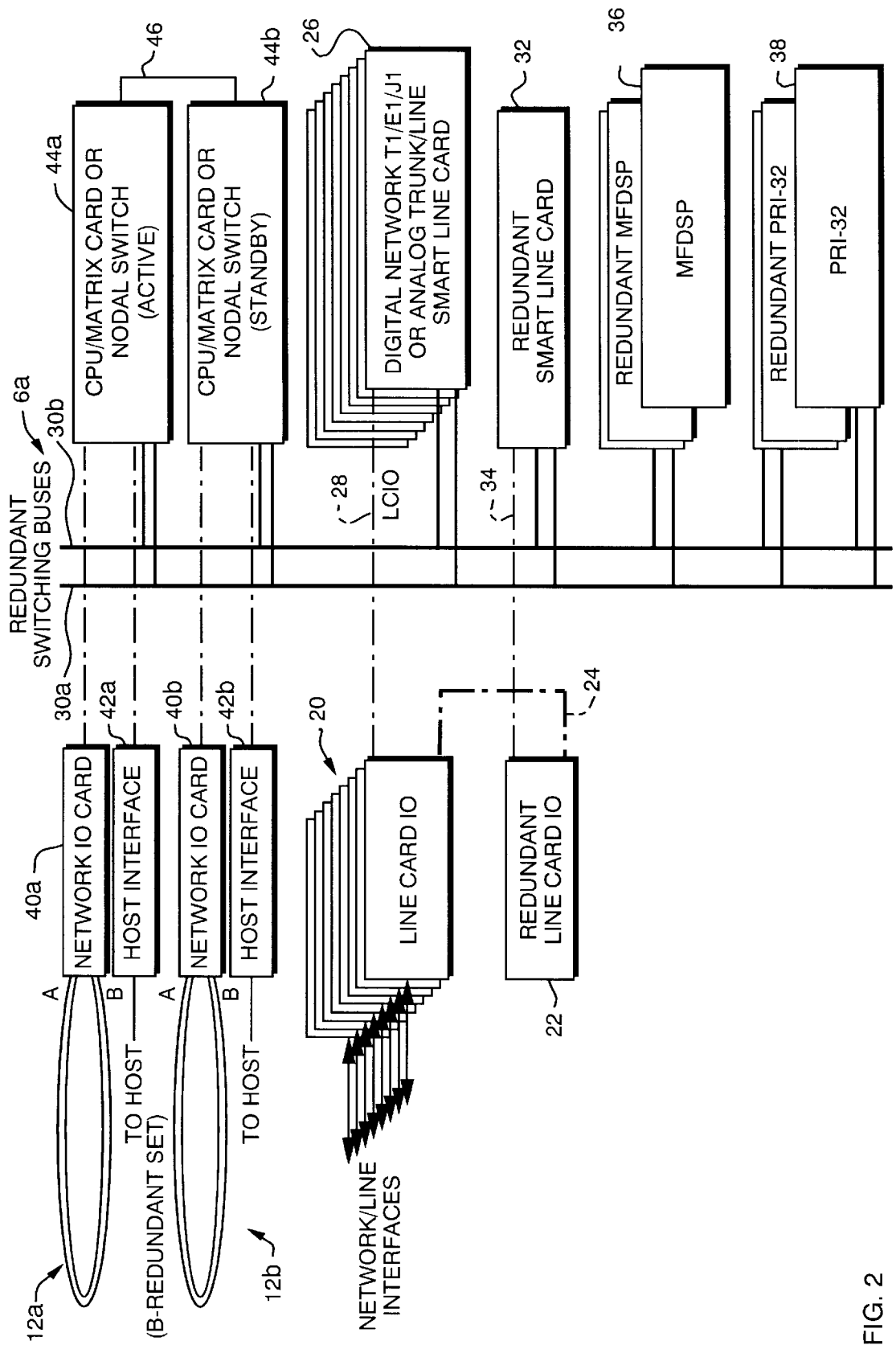
FIG. 2 is a block diagram of one type of programmable switching node which may be used in the system of FIG. 1.

FIG. 2 illustrates the major functional components of the preferred embodiment of one type of programmable switching node 6a which may be used in the system of FIG. 1. Digital or analog network/line interfaces are terminated on a series of line card input/output (I/O) cards 20. In a preferred embodiment, network/line interfaces representing a total of 2,048 ports maybe terminated by line card I/O cards 20. Redundant line card I/O card 22 may also be provided, if desired.

A series of digital network T1, E1, J1 or analog trunk/line cards 26 communicate with line card I/O cards 20 over LC I/O lines 28. Line cards 26 are also interfaced with redundant switching buses 30a and 30b. An optional redundant line card 32 is also provided, if desired, which communicates with redundant line card I/O card 22 over redundant LC I/O bus 34. Other types of network/line interfaces such as DS3 and SONET or others may also be provided.

A variety of communications services such as tone detection and generation, conferencing, voice-recorded announcements, call progress analysis, speech recognition, ADPCM compression and many others are provided by one or more multifunction digital signal processing (MFDSP) cards 36. ISDN Primary Rate service and other packet communications services are provided by one or more PRI-32 cards 38. Redundant MFDSP cards 36 and redundant PRI-32 cards 38 may be optionally included.

The CPUs in the various cards exchange messages with one another over the redundant switching buses 30a and 30b. The switching buses 30a and 30b each include a high level data link control (HDLC) bus (not shown separately.)

A network I/O card 40a serves as an interface between inter-nodal network 12a and a CPU matrix card/nodal switch 44a. A second network I/O card 40b serves as an interface between an optional, second inter-nodal network 12b and an optional, second CPU matrix card/nodal switch 44b, which is preferably of the same construction as nodal switch 44a. The CPU/matrix card/nodal switches 44a and 44b are interfaced with switching buses 30a and 30b and with host interfaces 42a and 42b. The CPU matrix cards/ nodal switches communicate with one another via midplane HDLC bus 46. If desired, a redundant CPU/matrix card and a host interface (not shown) may be included.

The node 6a interfaces with the inter-nodal network 12 via network I/O card 40a having ports A and B. The network I/O card 40b provides redundancy. Interface with the inter-nodal network 12 allows the node to communicate with other switching nodes and other voice processing resource nodes in the system 2 which facilitates real time call processing functions and other services such as conferencing. The interface to the inter-nodal network 12 also provides a communication link for nodes which may not be connected directly to the host 4. The host 4 typically sends messages to the matrix card about a variety of matters such as, for example, initial configuration information for that node, system level configuration information including whether there is a change in the system due to the addition of a new node or a previously active node going out of service, or a fault in the system in which case corresponding fault isolation information is also provided.

Figure 3:
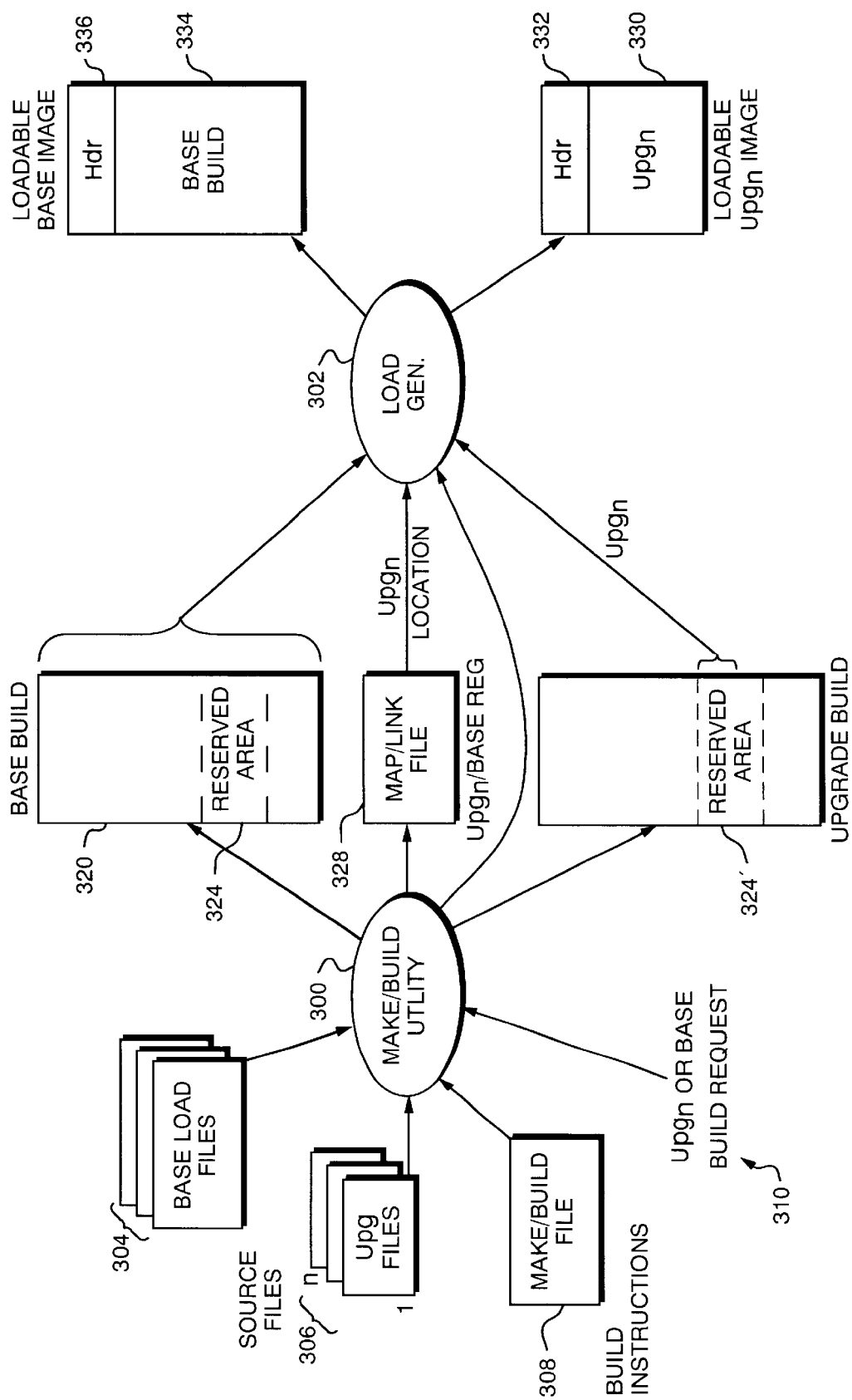
FIG. 3 is a block diagram of the software tasks and architecture employed in the method of building a software upgrade in accordance with the present invention.

The in-service upgrade method and apparatus of the present invention will now be described with reference to FIGS. 3, 4A and 4B. A make/build software utility 300 and a load generator task 302 are used in an offline development system appropriate for the operation. The products of the software so developed are formed into downloadable image files which are transferred to a service provider's host computer 4 or a network file server (not shown). As will be understood by those skilled in the art, there are several ways in which the software for a base build and an upgrade may be formulated. In accordance with one preferred embodiment of the invention, the base build and the upgrade are constructed of "C" functions, i.e., C programming language source level functions. The base set of software for the system is represented in FIG. 3 by the base load files 304. The upgrade source files 306 may contain several different upgrades, 1 through n, each of which might represent an upgrade to a particular type of targeted card, such as the matrix cards.

The make/build utility 300 constructs a software "build" from the base load files 304 and the upgrade source files 306 in accordance with build instructions 308. More specifically, an upgrade or base build request message instruction 310 instructs the make/build utility 300 to prepare a build. The make build utility 300 employs a compiler and linker to organize and locate all the files in certain, predetermined memory portions in accordance with build instructions 308. In the first instance, the base set of files must be produced. Initially, when building the base build for the first time, there is no upgrade per se, but the upgrade source files 306 do contain information that causes the reserved memory area to be set aside. The make/build utility 300 thus creates the base build 320 with the reserved memory area 324 allotted for future upgrades. Subsequently, the base build is downloaded. The base build will be actively running on the system when a substantive upgrade (which changes code or adds additional code) is to be downloaded to the system while in service.

When preparing such an upgrade, the build instructions 308 inform the make/build utility 300 to re-build the base build even though the base build is at that time actively running on the system. Upgrade source files are edited to replace the instructions which created the reserve memory segment with the source of an actual upgrade. The make/ build utility 300 is instructed via the build instructions 308 to rebuild the base build with the edited upgrade source files. The base build is rebuilt in order to assure that the upgrade is located in the reserved memory area of the architecture. Rebuilding the base set of software also establishes proper address resolution so that software routines called by the upgrade which are resident in the base build will be identified with the correct address.

The make/build utility 300 produces the upgrade build utilizing the upgrade source files 306 and the instructions 308 which cause the make/build utility 300 to place the upgrade in the reserved area 324'. The mechanism for ensuring that the upgrade is located in the reserved memory area is compiler and linker dependent. Typically, the upgrade source files contain a statement, such as a pragma statement, which indicates that each of the products that comprise the upgrade are to be associated with a name. Specifically, certain products are assigned a predetermined name in accordance with a suitable naming convention. At compile time, the products, which may include code, initialized data, uninitialized data, constants and strings, each have a unique name. During link time, when all addresses get resolved and items get located in memory, the linker is given instructions by the make/build utility 300 that state that the products of the upgrade having a particular name are to be loaded into the reserved memory area 324' beginning at one particular address. Those products of the upgrade identified by a different name are to be located in the reserved memory area beginning at another address.

A map/link file is generated as a result of the build process. The map/link file 328 includes the names of the products of the upgrade as well as the addresses in the reserved memory area at which they are located. Using this information in the map/link file 328, the load generator 302 locates the beginning and end addresses of each upgrade, i.e., $Upg_1$ through $Upg_n$ in the memory image of the build. In response to a message such as "generate $Upg_1$" the load generator 302 grabs the upgrade information after reading the addresses from the map/link file 328. After obtaining this information, the load generator 302 then extracts the upgrade portion of the build image and adds a header 332 to it so that the upgrade is ready to be downloaded onto the active system. It may perform several of the following functions depending upon the compiler and linker which are utilized in the build process: the load generator may create data records of equal length, compress the data and convert S records into binary records so that the upgrade is ready for downloading.

The header 332 indicates what the loadable image is and where it is to be loaded onto the system. More specifically, the header contains information stating which upgrade it is, 1 through n. The header 332 also includes the information about which card in the system the upgrade is to be loaded onto and where in the memory storage device on the card it is to be loaded. The header 332 further preferably includes the revision identification (ID) of the base build with which the upgrade is built. This ID relates to system integrity in that it allows the card resident loader to determine whether or not the upgrade it is receiving is compatible with the base load it is running.

It may also be desirable from time to time to create a new loadable base image. A loadable base image is generated by the load generator in a similar manner as is followed for an upgrade, and is shown in FIG. 3 as base build 334 having header 336.

Now, the loadable upgrade$_n$ image is ready to be downloaded onto the system. The download of upgrades is illustrated in greater detail in FIGS. 4A and 4B. FIG. 4A illustrates the software architecture components and memory storage devices which reside on an active matrix card 400. The active matrix card 400 provides the central control for upgrade downloads. It also provides the central battery-backed repository for downloaded upgrade images. The active matrix card 400 also participates in the distribution of those upgrade images to the affected line cards and function cards.

It is noted that it may be preferable in certain circumstances to initially download a full, new base load, which replaces much of the system software, to a standby matrix card. In this way, it can be determined whether the download of a full, new base load has been successful. If the download is found to be successful, the standby matrix card can then be instructed to begin operating as the active matrix card (with the new base load running on it). The former active matrix card then is instructed to operate as the standby card, after the new software has similarly been downloaded to it.

The telecommunication system of the preferred embodiment includes a host 4 (FIG. 4A) which communicates with the inter-connected switching and non-switching nodes. A switching node includes a CPU/matrix card 400. The CPU matrix card 400 is also sometimes referred to herein as "the matrix board 400". A system loader task 402 runs on the matrix card 400 and the system loader task 402 includes an upgrade manager 404. The upgrade manager 404 responds to instructions relating to upgrades, such as instructions to obtain stored upgrades. The base loads 406 and the upgrades 408 can be stored on the matrix board itself, or may be stored off board on a disk or on a network file server, as desired in a particular application. Whichever way in which such files are stored, the upgrade manager 404 has access to the stored loads and can obtain the files when instructed to do so.

The matrix card 400 contains several memory storage devices associated with its CPU. The primary random access memory (RAM) 426 contains, in uncompressed form, much of the software code utilized to operate the matrix card 400. Some of the code is also stored in a read only memory (ROM) (not shown) but this code is typically software which remains unchanged after the initial configuration of the system such as its boot routine. In addition to those storage devices, a backup RAM 429 is provided which is powered by a battery for emergency use in the case of a power outage.

In order for a download to begin, the host 4 issues an upgrade download message via its Ethernet connection 8 with the matrix board 400. Preferably, the host 4 downloads all upgrade information which is destined for a particular node to the active matrix card 400 of that node. In some instances, it may be desirable to download an upgrade directly to a targeted card, such as a line card. However, it is preferred to download upgrades initially to the matrix card 400, so that there is a single unit in the node that possesses a definitive list of the base loads and upgrades which reside on each card in that node. This is important for several reasons including for purposes of maintaining complete redundancy.

In response to the host-issued download message, the upgrade manager 404 running on the matrix card 400 of the node obtains the relevant upgrade 408 which may be any one of Upgrades 1 through n, from the stored load area 409. It then downloads the upgrade from the host through it (the upgrade manager 404) to the stored load area on the matrix board 400. Thereafter, as described in further detail herein, certain upgrades may be distributed to another card in accordance with the instructions received by the upgrade manager 404 from the host 4.

The upgrade is loaded onto the matrix card itself if the upgrade pertains to operations of the CPU on the matrix card 400. More specifically, the upgrade information is stored in executable form in the primary RAM 426 of the matrix card 400. The upgrade manager 404 distributes or loads an upgrade 408 as shown by arrow 422 to the reserved upgrade memory segment 427 of the primary RAM 426 of the matrix board 400. As illustrated in FIG. 4A, the various upgrades, i.e., $Upg_1$–$Upg_n$ are thus installed in the reserved upgrade memory segment 427 of the primary RAM 426. Compression of upgrades may be an option for back-up storage of the upgrade if the upgrade image is of a sufficiently large size on which to perform a compression algorithm. The identical upgrade information is downloaded to a standby matrix card (not shown) via a local matrix-to-matrix HDLC bus, in both uncompressed executable format and compressed format in a manner similar to that described with reference to the active matrix card 400.

Upgrades targeted for line or function cards are distributed by the active matrix card 400. For purposes of illustration, we have shown in FIG. 4B a line card 420. It should be understood that the downloading of upgrades destined for other card types such as packet engine cards and other function cards is handled in a similar manner. Assuming that the upgrade 408 is targeted for the line cards, the appropriate sets of upgrades are distributed to the line cards 420, by the upgrade manager 404 as depicted by arrow 428 across a midplane matrix-to-line card HDLC bus 430. The upgrade is distributed across the HDLC bus 430 in response to a card upgrade download message to the upgrade manager 431 running on the line card 420.

In a manner similar to that described with reference to the matrix card 400 the upgrade manager 431 of the line card 420 then loads the upgrade as depicted by arrow 432 into the reserve upgrade memory segment 434 of the primary RAM 435 of the line card 420.

The line card 420 has a card monitor task 436 running on its CPU. The card monitor task 436 contains information about the tasks that are running on the card, the status of the card and whether the card is operating properly. The card monitor task 436 receives through an upgrade manager task 431 information about upgrades which have been loaded and installed to the reserve upgrade memory segment 434. Upgrades are listed and identified in the card upgrade status area 440 and the base load is identified in the card base load status area illustrated by block 444. After a card upgrade download, a list of all upgrades contained on that card is transmitted back via the HDLC bus, as depicted by arrow 448, back to the system monitor task 450 running on the matrix card 400.

When an upgrade is downloaded to the matrix card 400 or is distributed by the upgrade manager 404 of the matrix card 400, the upgrade manager 404 has certain responsibilities with respect to the upgrade. First, the upgrade manager 404 loads and stores a list of the upgrades and the base loads as shown in the card upgrade status area 454 (FIG. 4A) and the card base load status area 452 so that the system monitor task 450 has this information. The upgrade manger 404 also verifies the integrity of the upgrade. It does so by examining the header 332 (FIG. 3). The header 332 indicates whether the information contained in that image is a base load or is an upgrade. If it is an upgrade, the header identifies which upgrade it is by its revision identification number. Preferably, the revision identification number of an upgrade matches the unique revision identification number of the base build with which it is intended to operate. The upgrade manager 404 thus checks the revision number to make sure it is the correct upgrade for the base build then running on the system. It also validates the integrity of the upgrade by checking the size and the card type for which the upgrade is targeted. The upgrade manger 404 can also perform other validity checks as desired in the particular application.

After the matrix card 400 has received, via its system monitor 450, messages from all line cards, function cards, and other types of cards which have received downloads, it will acknowledge this back to the host 4 by sending the host 4 a per card base load status list 452 and a per card upgrade status list 454. The host 4 has the information as to which upgrades each card should contain and it compares this information with the list of upgrades received from the matrix board system monitor task 450. Any discrepancy is then resolved or an error is noted.

Once the upgrades are downloaded into the matrix cards and the appropriate upgrades are distributed to the other line and function cards in the system, and the upgrades have been verified and acknowledged to the host, the upgrades can be activated. The host 4 issues activate/deactivate messages which are passed onto an upgrade start task 448 running on the matrix card 400. In accordance with the preferred embodiment of the invention, all upgrades do not have to be activated at once. For example, all line cards of a certain type may contain a particular upgrade, however, the line cards in certain nodes, or for certain customers, may not require that upgrade at that particular time. The user may choose not to active the upgrade in every line card, but only in line cards in certain nodes.

In accordance with the present invention, activation is performed by overlaying an instruction at the beginning of an old function which transfers control to a different address that contains the new (upgrade) function. As noted, the method of activating an upgrade depends upon the processor being used and upon how the RAM is calling the routine. In one instance, a RAM may call a procedure directly by name. Alternatively, a routine may be called indirectly by reference to an address table or a jump table. In that instance, routines are called by scrolling through the table and executing the routines. In order to dynamically change the order in which the software is called, the entries in the jump table can be changed.

Figure 4A:
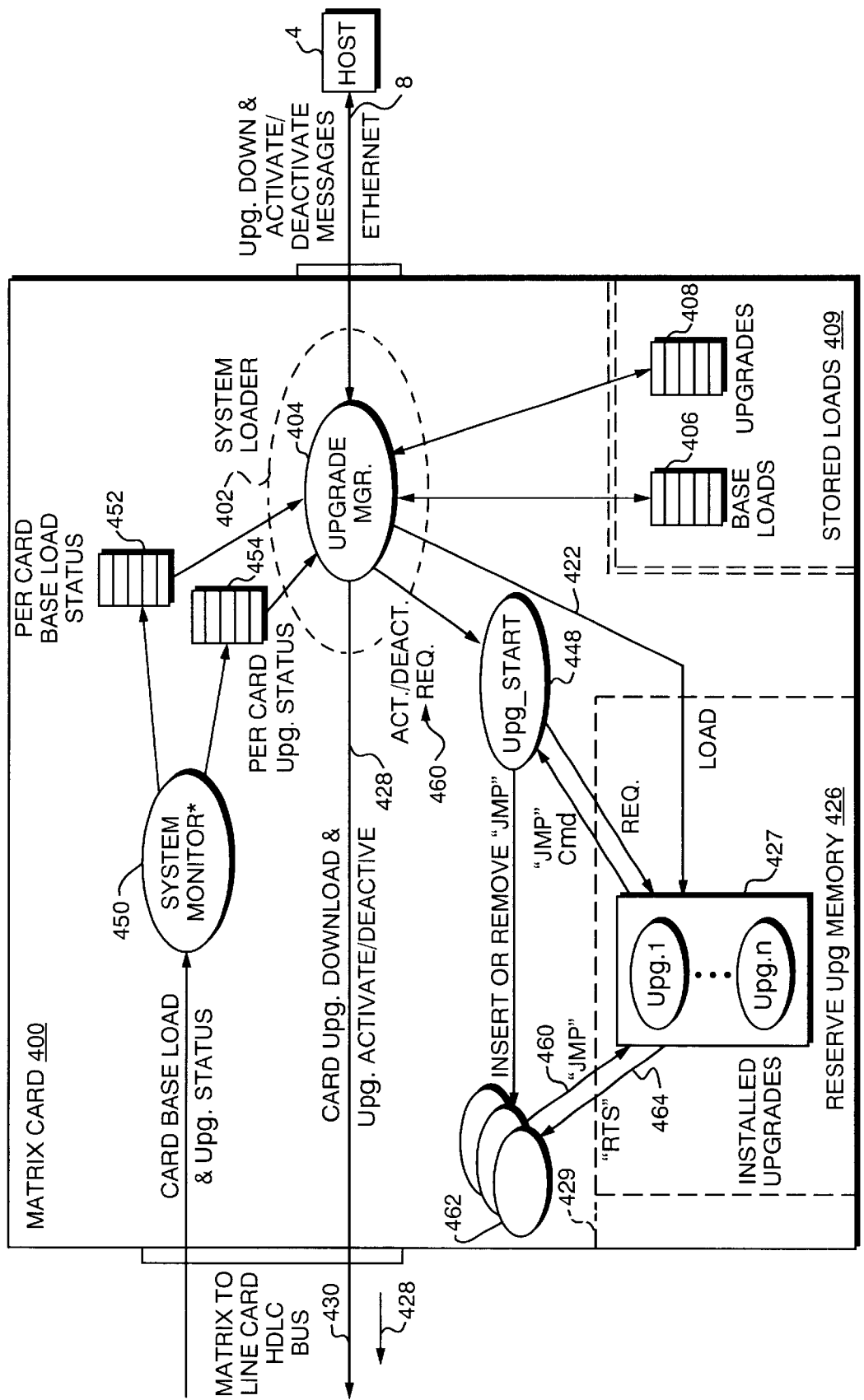
FIG. 4A is a schematic illustration of the matrix board in a programmable switching node including the software tasks and memory storage devices employed in the method and apparatus of downloading upgrades to the system of FIG. 1 in accordance with the present invention.
Figure 4B:
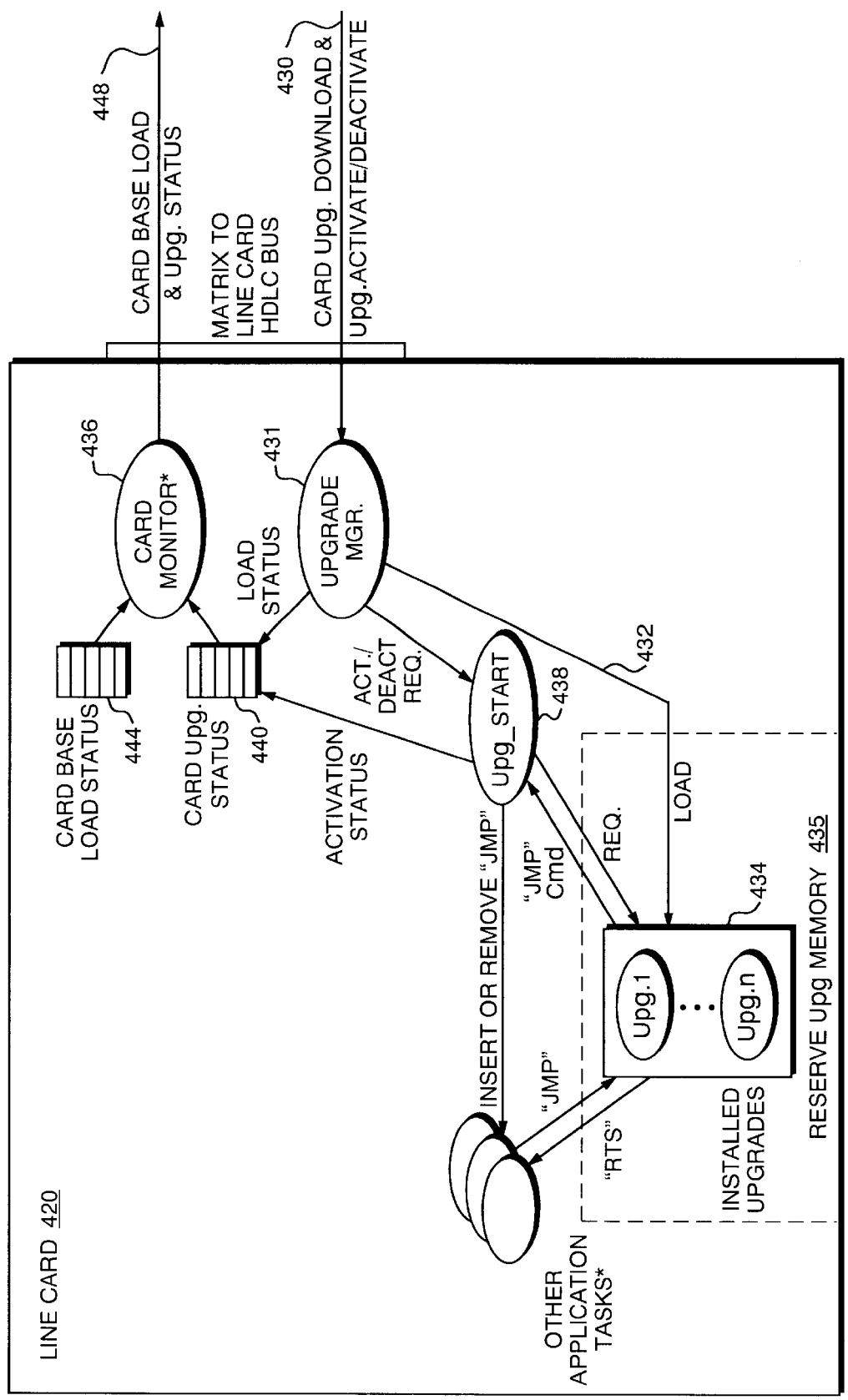
FIG. 4B is a schematic illustration of a line card in a programmable switching node including the software tasks and memory storage devices of the line card which receive downloads of upgrades from the matrix card of FIG. 1.

If the routine is being called by the direct approach, activation is performed in accordance with the present invention by the upgrade start task 448 which overlays a load-address-and-jump sequence 460 at the beginning of the old routine depicted by reference 462 in FIG. 4A. The number of instructions in this sequence varies depending upon the type of processor being used as will be understood by one skilled in the art. Briefly, a new address is inserted which directs the CPU to the reserve memory area 427 and thus to the upgrade $Upg_n$. The CPU jumps to that address and executes the new (upgrade) routine. After executing the new routine, a return-to-subroutine (RTS) message 464 in the sequence returns to the same place in the RAM to which it would have returned after the old function had executed.

If the routine is being called indirectly via a jump table, the method of the present invention includes overlaying the desired entry in the jump table with the address of the new routine. The new code is executed and then the CPU is returned back to the jump table to the point where it would have been after executing the old routine.

Prior to overwriting any code, however, it is preferred to save away the portion of the old function, which is to be overlaid by activation so that the upgrade process is reversible. More specifically, the old function is saved and the address of the location of the old function is stored so that if an upgrade is to be deactivated, the jump instruction is simply removed and the old function is reinstated where it had been in the original base build.

In order to maintain the integrity of the activation operation, it is desirable that the code fragment which is being overlaid with the load-address-and jump instruction is not actually executing at the moment the activation occurs. There are several ways in which to accomplish this. One embodiment of the invention includes building the activation routine as the lowest priority software task in the computer. This means that no other task is then executing, so that code, which is then executing, will not be inadvertently over-written. Specifically, in the illustrative embodiment, the upgrade start task 448 is identified as the lowest priority task on the board. The upgrade start task 448 runs when the other tasks have already run. Then, the upgrade start task 448 is given control of the processor; it locks out the other software for the short interval it takes to do the instruction overlay. Thus, the operation of overlaying an activation instruction sequence does not interfere with, or cannot be interfered with by, other software running on the computer. An alternative includes identifying which tasks are actually running at a particular point and performing the overlay if the piece of code being patched is not executing at that moment.

When the upgrade start task 448 has control of the processor, the CPU saves away the old address, overlays the new address and jump instruction so that the upgrade can be accessed. Then, interrupts are re-enabled and control of the CPU is given up. At this point, the upgrade has been validated, downloaded and activated while the overall system continues operation without interruption.

A query command can be generated by the host in which the host 4 queries the matrix card 400 for a list of upgrades that have been downloaded and whether those upgrades have been activated for each card in the node. The system monitor 450 can access the per card base load status 452 and the card upgrade status 454 and report a list of upgrades and base loads running on each card to the host 4.

In the case of a new line card being inserted or new node being added to the system, the matrix card 400 downloads the base load and then downloads all upgrades which is are associated with that particular revision of the base load. Then, upgrades will be activated as desired, in accordance with the present invention.

A list of the upgrades is maintained on the battery-backed memory so that, upon a restart after a power outage or a new node being added, then the matrix card will have the necessary information about which base load and which upgrade are to be running on the system. If any piece of the software is missing then the system loader 402 obtains this software from the stored load area, 406, 408 and it is downloaded and activated. It is also noted that configuration information is typically also downloaded when a card resets. Other information about system operations and call processing information is also downloaded in the normal course of events upon a restart.

Information may also be downloaded to the connect board of a voice processing node 7 (FIG. 1). The executable form of the upgrade is downloaded into its primary RAM (not shown). A standby connect board may also provided for redundancy. In accordance with the invention, each card, whether a matrix card, a line or function card, or a connect board contains a reserved memory segment into which the upgrade image is downloaded, stored, and activated or deactivated.

It should be understood that while a preferred embodiment of the invention as used in a telecommunication system has been described herein, the invention is equally applicable to other continuously running systems which include data processing components having associated addressable memory storage devices. Such systems include, for example, air traffic control systems, RADAR systems and industrial control systems.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. In a telecommunications system, comprising a plurality of interconnected nodes for performing telecommunications switching and other voice and data processing services, the nodes being interconnected by an inter-nodal network, and a host being connected in communicating relationship with at least one of the nodes, each node having at least one processing card containing a microprocessor with an associated memory storage device, the microprocessor in the processing card running software for controlling certain functions of the card and of the node as a whole, each node also including a plurality of line cards and function cards for performing call processing functions and call connections, a method of upgrading software in at least one of the cards in a node, while the telecommunications system remains active, the method including the steps of:

(A) making a base build of a software application program for operation of said telecommunication system, as a base load image;

(B) within said base build, establishing a reserved memory area in the memory storage device locations of each card in said telecommunications system for future upgrades;

(C) downloading said base load image from said host to said memory storage devices in cards in said telecommunications system;

(D) generating a software upgrade, by producing upgrade source code and making an upgrade build including sets of upgrade information destined for certain predetermined targeted cards in nodes in the system, and including as addresses for said sets of upgrade information the reserved memory areas set aside when said base build was produced;

(E) rebuilding said base load now including said software upgrades and compiling and linking said rebuilt base load for proper address resolution;

(F) extracting said software upgrade source code from said rebuilt base build to generate upgrade images, and including information in said upgrade images about the targeted card to which a particular portion of the software upgrade is to be downloaded;

(G) downloading said upgrade images from said host to said reserved memory segments in targeted cards;

(H) activating desired sets of upgrade information now resident on selected ones of said processing cards, line cards and function cards, whereby a software upgrade is effected in the system while the system continues to operate.

2. The method of claim 1 including the further step of initially downloading all software upgrade to the processing card in each node, and then distributing predetermined sets of upgrade information from said processing cards to reserved memory segments of selected line cards and function cards in the nodes whereby a software upgrade is effected in the system while the system continues to operate.

3. The method of claim 1 wherein said memory storage device includes an address table for dynamically calling up software routines, including the step of downloading new addresses into said address table in response to which the processor transfers control to a different address and calls up a set of new, upgrade information correspondingly downloaded into the respective reserve memory segment.

4. The method of claim 1 including the further step of: providing a back up memory storage device in selected cards which contains a compressed copy of said upgrade information and further providing said back up memory storage device with a battery.

5. The method as defined in claim 1, including the further step of:

overlaying a jump instruction at data locations to which the processor was originally directed, said destinations being at addresses associated with software code which is to be replaced by said software upgrade code, and the jump instruction is instead read, in response to which the processor points to a new location in a reserved memory area in which a new, upgrade code is located and is thus executed, after which the processor is instructed to return to the point to which it would have returned had the prior routine been called.

6. In a data processing system, having a software application program for operating various components of the system, with each component including an associated addressable memory storage device having memory storage locations, a method of upgrading portions of the software while the system is operating, the method including the steps of:

(A) making a base build of a software application program for operation of the system, as a base load image;

(B) in said base build, establishing in the memory storage locations, of the base software build reserved memory areas and identifying the addresses of said reserved memory areas for future upgrades;

(C) downloading said base load image;

(D) building a software upgrade to be associated with the base build, said software upgrade being compiled and linked with the base build such that the addresses of instructions and portion of the code of said software upgrade correspond with those of the base software build;

(E) extracting software upgrade code from said base build and including information about the targeted device to which a particular portion of the software upgrade code is to be downloaded;

(F) downloading said software upgrade code to the reserved memory segment of the targeted device; and (G) activating desired sections of said software upgrade while the base build is operating on said system.

7. The method as defined in claim 6 including the further step of employing an address table for dynamically calling up software routines, including downloading new addresses into said address table in response to which a processor transfers control to a different address and calls up a new, upgrade code correspondingly downloaded into the respective reserve memory area.

8. The method as defined in claim 6, including the further step of providing a backup memory storage device that contains a compressed copy of said software upgrade code, and further providing said back up memory storage device with a battery.

* * * * *